United States Patent
Tsukida et al.

(10) Patent No.: US 9,497,399 B2
(45) Date of Patent: Nov. 15, 2016

(54) IMAGING APPARATUS INCLUDING READOUT CIRCUITS AND OUTPUT LINES, AND DRIVING METHOD THEREOF

(71) Applicant: CANON KABUSHIKI KAISHA, Tokyo (JP)

(72) Inventors: Kentaro Tsukida, Kawasaki (JP); Yukio Araoka, Hiratsuka (JP); Toshiaki Ono, Ebina (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 65 days.

(21) Appl. No.: 14/300,536

(22) Filed: Jun. 10, 2014

(65) Prior Publication Data
US 2015/0009385 A1    Jan. 8, 2015

(30) Foreign Application Priority Data

Jul. 4, 2013    (JP) .................................. 2013-141006

(51) Int. Cl.
 *H04N 5/374* (2011.01)
 *H04N 5/376* (2011.01)
 *H04N 5/378* (2011.01)
 *H04N 5/345* (2011.01)

(52) U.S. Cl.
 CPC .............. *H04N 5/374* (2013.01); *H04N 5/378* (2013.01); *H04N 5/3765* (2013.01); *H04N 5/3452* (2013.01)

(58) Field of Classification Search
 CPC .... H04N 5/374; H04N 5/378; H04N 5/3742; H04N 5/3452
 See application file for complete search history.

(56) References Cited

U.S. PATENT DOCUMENTS

| | | | |
|---|---|---|---|
| 7,508,433 B2 | 3/2009 | Koseki et al. | |
| 7,787,037 B2 | 8/2010 | Ono et al. | |
| 7,817,199 B2 | 10/2010 | Yamashita et al. | |
| 7,986,353 B2 | 7/2011 | Ono | |
| 8,085,319 B2 | 12/2011 | Ono et al. | |
| 8,810,705 B2 | 8/2014 | Ono | |
| 2004/0085465 A1* | 5/2004 | Inui ...................... | H04N 5/378 348/241 |
| 2005/0083420 A1* | 4/2005 | Koseki ................. | H04N 5/378 348/294 |

(Continued)

FOREIGN PATENT DOCUMENTS

JP    2005-143078    6/2005

OTHER PUBLICATIONS

U.S. Appl. No. 14/301,552, filed Jun. 11, 2014.
U.S. Appl. No. 14/314,141, filed Jun. 25, 2014.
U.S. Appl. No. 14/470,141, filed Aug. 27, 2014.

*Primary Examiner* — Abdelaaziz Tissire
(74) *Attorney, Agent, or Firm* — Fitzpatrick, Cella, Harper & Scinto

(57) ABSTRACT

An imaging apparatus includes: pixel circuits (1) arranged in a matrix, each configured to generate a pixel signal by photoelectric conversion; readout circuits (50) each provided correspondingly to each column of the plurality of pixel circuits, and each configured to read out the pixel signals from the pixel circuits of a corresponding column; 2n first output lines (5-1 to 5-8) to which output terminals of every 2n columns of the readout circuits are commonly connected; and an adding unit configured to add the pixel signals from the pixel circuits arranged in different columns. Among the readout circuits on plural columns connected to the pixel circuits which are subjected to adding by the adding unit, only the readout circuit on one column performs the read out, and all of the 2n first output lines receives input of the pixel signals from one of the plural readout circuits.

7 Claims, 7 Drawing Sheets

(56) References Cited

U.S. PATENT DOCUMENTS

| | | | |
|---|---|---|---|
| 2005/0285958 A1* | 12/2005 | Matsuda | H04N 5/347 348/300 |
| 2006/0132622 A1* | 6/2006 | Ikeyama | H04N 5/772 348/231.99 |
| 2006/0203113 A1* | 9/2006 | Wada | H04N 9/045 348/302 |
| 2007/0081395 A1* | 4/2007 | Cho | G11C 8/10 365/189.17 |
| 2007/0229686 A1* | 10/2007 | Hiyama | H04N 5/3456 348/294 |
| 2007/0229687 A1* | 10/2007 | Hiyama | H04N 3/1568 348/294 |
| 2008/0067327 A1* | 3/2008 | Koseki | H04N 3/155 250/208.1 |
| 2008/0297627 A1* | 12/2008 | Matsuda | H04N 5/3575 348/243 |
| 2009/0033780 A1* | 2/2009 | Murata | H04N 3/155 348/308 |
| 2010/0051784 A1* | 3/2010 | Parks | H04N 3/1562 250/208.1 |
| 2012/0281124 A1* | 11/2012 | Suzuki | H01L 27/14843 348/294 |
| 2013/0176468 A1 | 7/2013 | Ono | |
| 2013/0181115 A1 | 7/2013 | Ono | |
| 2013/0182157 A1 | 7/2013 | Ono | |
| 2013/0182163 A1 | 7/2013 | Kobayashi et al. | |
| 2013/0201383 A1* | 8/2013 | Okado | G02B 7/34 348/345 |
| 2014/0197302 A1 | 7/2014 | Araoka et al. | |
| 2014/0375859 A1* | 12/2014 | Ono | H01L 27/14601 348/308 |

* cited by examiner

IMAGING APPARATUS INCLUDING READOUT CIRCUITS AND OUTPUT LINES, AND DRIVING METHOD THEREOF

BACKGROUND OF THE INVENTION

1. Field of the Invention

The present invention relates to an imaging apparatus and a driving method thereof.

2. Description of the Related Art

A high speed reading method for an area-type solid-state imaging apparatus with an increased number of pixels has been proposed (see, e.g., Japanese Patent Application Laid-Open No. 2005-143078). In Japanese Patent Application Laid-Open No. 2005-143078, during readout of signals from multiple readout circuits to multiple horizontal output lines, a readout charging period (statically determined period) for multiple columns is secured for signals of one column, and the signals are multiplexed, thereby enabling the signals to be read with low power consumption at high speed.

Unfortunately, according to Japanese Patent Application Laid-Open No. 2005-143078, with a configuration including an even-number of horizontal output lines, pixel skipping driving for reading every even-numbered columns causes a specific horizontal output lines to be driven at a high frequency, and reduces the readout charging period in comparison with the case of normal readout, thereby reducing the signal amplitude.

SUMMARY OF THE INVENTION

According to an aspect of the present invention, an imaging apparatus comprises: a plurality of pixel circuits arranged in a matrix, and each pixel circuit configured to generate a pixel signal by photoelectric conversion; a plurality of readout circuits each provided correspondingly to each column of the plurality of pixel circuits, and each configured to read out the pixel signals from the pixel circuits of a corresponding column; 2n first output lines to which output terminals of every 2n columns of the readout circuits are commonly connected, n being a positive integer; and an adding unit configured to add the pixel signals from the pixel circuits arranged in different columns, wherein among the readout circuits for plural columns connected to the pixel circuits outputting the pixel signals added by the adding unit, only the readout circuit for one of the plural columns performs the read out, and all of the 2n first output lines receives input of the pixel signals from one of the plural readout circuits.

According to a further aspect of the present invention, in a driving method of an imaging apparatus, an imaging apparatus comprises: a plurality of pixel circuits arranged in a matrix, and each pixel circuit configured to generate a pixel signal by photoelectric conversion; a plurality of readout circuits each provided correspondingly to each column of the plurality of pixel circuits, and each configured to read out the pixel signals from the pixel circuits of a corresponding column; 2n first output lines to which output terminals of every 2n columns of the readout circuits are commonly connected, n being a positive integer; and an adding unit configured to add the pixel signals from the pixel circuits arranged in different columns, wherein the method comprises: performing the read out, among the readout circuits for plural columns connected to the pixel circuits outputting the pixel signals added by the adding unit, by only the readout circuit for one of the plural columns, and receiving, by all of the 2n first output lines, input of the pixel signals from one of the plural readout circuits.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

First Embodiment

Figure 1:
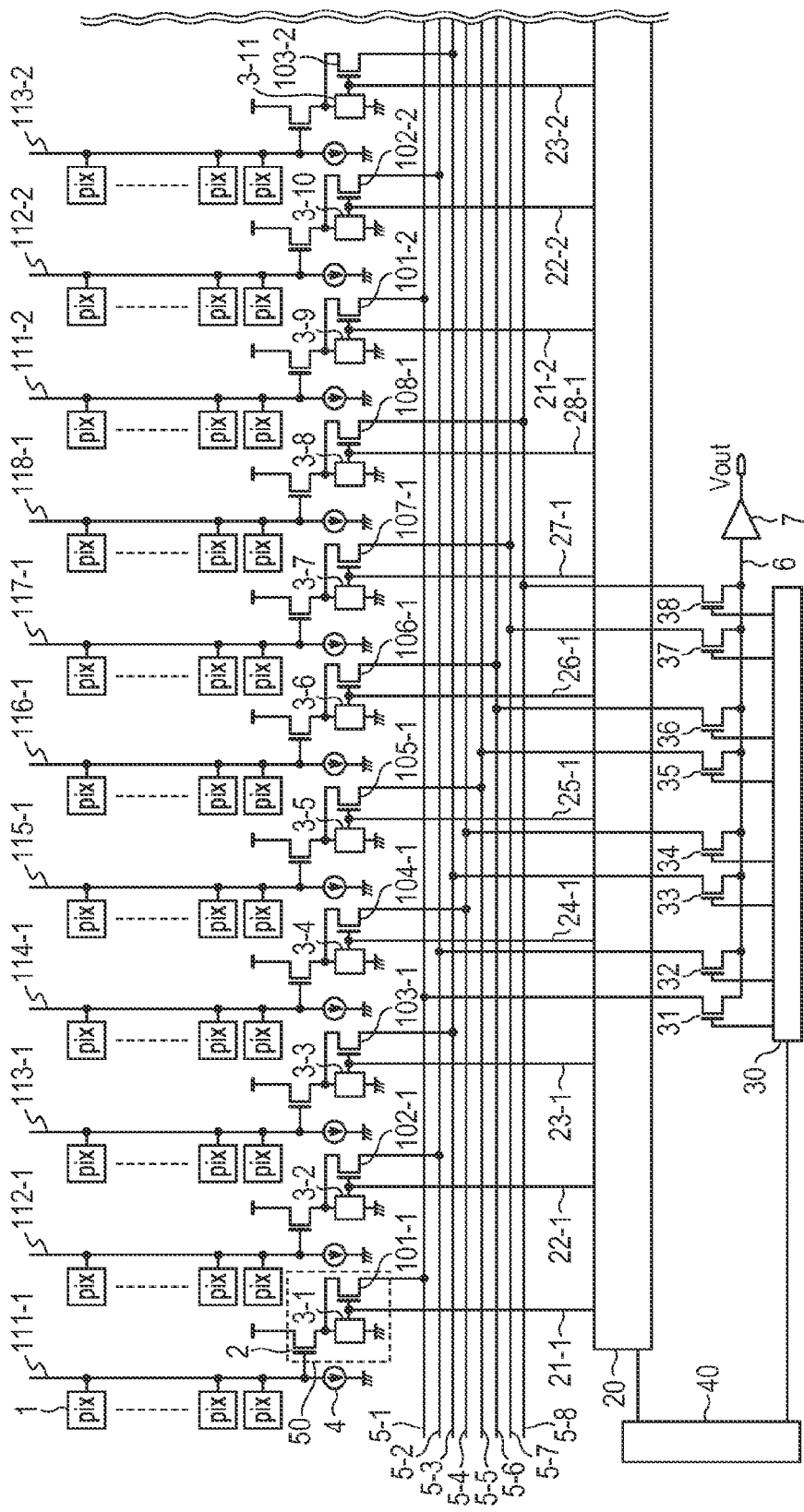
FIG. 1 is a configuration diagram of an imaging apparatus according to a first embodiment.

FIG. 1 is a configurational diagram of an imaging apparatus according to a first embodiment. The imaging apparatus includes a plurality of pixel circuits 1 arranged in a two-dimensional matrix, and vertical signal lines 111-1 to 118-1 and 111-2 to 118-2 connected to output terminals of the pixel circuits 1 on the respective same columns. The pixel circuits 1 generate pixel signals through photoelectric conversion. Current sources 4 of the pixel circuits 1 are connected to the respective vertical signal lines 111-1 to 118-1 and 111-2 to 118-2. Multiple readout circuits 50 are provided for the pixel circuits 1 on the respective columns, and read pixel signals from the pixel circuits 1 of a corresponding column. The readout circuits on the respective columns 50 include input transistors 2, current sources 3-1 to 3-11, and column selecting switches 101-1 to 108-1 and 101-2 to 108-2. The input transistor 2 and the current source 3-1 configure a source follower circuit. The input transistor 2 includes a gate connected to the vertical signal line 111-1, and a drain connected to a power source potential node. The current sources 3-1 to 3-11 are connected between the sources of the input transistors 2 and ground potential nodes. The column selecting switches 101-1 to 108-1 and 101-2 to 108-2 have gates connected to the control lines 21-1 to 28-1 and 21-2 to 28-2, drains connected to the sources of the input transistors 2, and sources connected to first horizontal output lines 5-1 to 5-8. The sources of the column selecting switches 101-1 to 108-1 are connected to the respective first horizontal output lines 5-1 to 5-8. The sources of the column selecting switches 101-2 to 108-2 are connected to the respective first horizontal output lines 5-1 to 5-8. The column selecting switches 101-1 to 108-1 and 101-2 to 108-2 are switches for connecting source follower circuits 2 and 3-1 to the first horizontal output lines 5-1 to 5-8. Pixel circuits 1 and readout circuits 50 on every eight columns are classified into one group. For instance, a first group includes the vertical signal lines 111-1 to 118-1, and the column selecting switches 101-1 to 108-1. A second group includes the vertical signal lines 111-2 to 118-2, and the column selecting switches 101-2 to 108-2. The number of first horizontal output lines 5-1 to 5-8 are not limited to eight. Alternatively, the number may be 2n; n is an integer at least one. 2n first horizontal output lines 5-1 to 5-8 are commonly connected to the output terminal of readout circuit 50 on every 2n columns.

Current sources 3-1 to 3-8 and the column selecting switches 101-1 to 108-1 are subjected to on (conduct)/off (non-conduct) control according to control lines 21-1 to 28-1 from a column selecting switch control circuit 20. Control of turning on the current source 3-1 causes the readout circuit 50 to perform readout operation. Turning-on of the column selecting switches 101-1 to 108-1 causes signals of the vertical signal lines 111-1 etc. to be read into the first horizontal output lines 5-1 to 5-8. Control of turning off the current source 3-1 stops the operation of the readout circuit 50. Accordingly, no energy consumption occurs. The signals read into the first horizontal output lines 5-1 to 5-8 are held until next control of turning on the column selecting switches 101-1 etc. The signals read into the first horizontal output lines 5-1 to 5-8 are read by group selecting switches 31 to into a second horizontal output line 6. The group selecting switches 31 to 38 are controlled by a group selecting control circuit 30 in units of groups. The column selecting switch control circuit 20 and the group selecting control circuit 30 are controlled by a readout mode switching circuit 40 that controls signal readout modes. The signal readout modes include a total pixel reading mode for reading signals from all the pixel circuits 1, and a pixel skipping reading mode for reading signals from part of the pixel circuits 1. When the readout mode switching circuit 40 designates the total pixel reading mode, the column selecting switch control circuit 20 drives the column selecting switches 101-1 etc. in every group. During designation of the pixel skipping reading mode, the column selecting switch control circuit 20 drives only the readout circuit 50, the column selecting switch 101-1 or the like in the group to be read.

Figure 2:
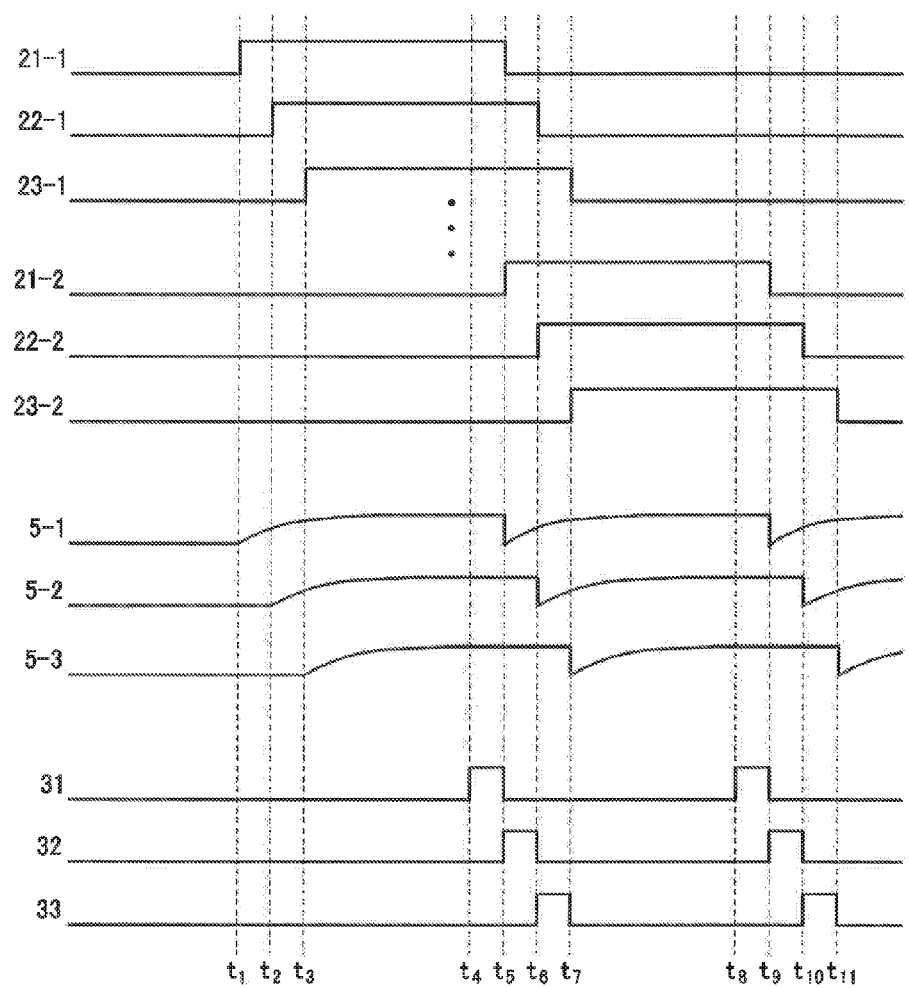
FIG. 2 is a timing chart of total pixel reading in the first embodiment.

FIG. 2 is a timing chart of a method of driving the total pixel reading mode according to the first embodiment. In this embodiment, eight columns form one group. On-times of adjacent readout circuits 50 are overlapped each other while being shifted. For instance, on the first column, the source follower circuit including the input transistor 2 and the current source 3-1 thus secures time for charging the first horizontal output lines 5-1 to 5-8 having a large parasitic capacitance. The signals of the first horizontal output lines 5-1 to 5-8 are read by the second horizontal output line 6 having a small parasitic capacitance at high speed.

On time t1, the column selecting switch control circuit 20 sets the control line 21-1 to a high level, which turns on the column selecting switch 101-1 and the current source 3-1. At this time, current sources other than the current source 3-1 are completely stopped or low current may flow therethrough. Until time t4 when the group selecting switch 31 is turned on, no signal is output to the second horizontal output line 6. Accordingly, the potential of the first horizontal output line 5-1 transits to a level according to the pixel signal of the pixel circuit 1.

Next, on time t2, the column selecting switch control circuit 20 sets the control line 22-1 to the high level, which turns on the column selecting switch 102-1 and the current source 3-2. The potential of the first horizontal output line 5-2 transits to a level according to the pixel signal of the pixel circuit 1. Next, on time t3, the column selecting switch control circuit 20 sets the control line 23-1 to the high level, which turns on the column selecting switch 103-1 and the current source 3-3. The potential of the first horizontal output line 5-3 transits to a level according to the pixel signal of the pixel circuit 1. Although omitted from FIG. 2, up to the column selecting switch 108-1 and the current source 3-8, the elements are turned on at constant time intervals in a similar manner as described above, thus precharging the first horizontal output lines 5-1 to 5-8 to potentials according to the pixel signals. The pixel signals of the other groups are not read into the first horizontal signal lines 5-1 to 5-8 because the current source 3-9 and the column selecting switch 101-2 are off.

Next, on time t4, the group selecting switch 31 is turned on, and the signal on the first column in the first group charged in the first horizontal signal line 5-1 is read into the second horizontal signal line 6 and output via an output amplifier 7.

Next, on time t5, the column selecting switch control circuit 20 sets the control line 21-1 to a low level, which turns off the column selecting switch 101-1, the current source 3-1 and the group selecting switch 31. At the same time or a little later, the column selecting switch control circuit 20 sets the control line 21-2 to the high level, which turns on the column selecting switch 101-2 and the current source 3-9 in the second group, and starts to charge the potential of the first horizontal output line 5-1 to a potential according to the signal of the vertical signal line 111-2.

Next, on time t6, the column selecting switch control circuit 20 sets the control line 22-1 to the low level, which turns off the column selecting switch 102-1, the current source 3-2 and the group selecting switch 32. At the same time or a little later, the column selecting switch control circuit 20 sets the control line 22-2 to the high level, which turns on the column selecting switch 102-2 and the current source 3-10 in the second group, and starts to charge the potential of the first horizontal output line 5-2 to a potential according to the signal of the vertical signal line 112-2.

Next, on time t7, the column selecting switch control circuit 20 sets the control line 23-1 to the low level, which turns off the column selecting switch 103-1, the current source 3-3 and the group selecting switch 33. At the same time or a little later, the column selecting switch control circuit 20 sets the control line 23-2 to the high level, which turns on the column selecting switch 103-2 and the current source 3-11 in the second group, and starts to charge the potential of the first horizontal output line 5-3 to a potential according to the signal of the vertical signal line 113-2. The processes are repeated in a similar manner.

As described above, the charging periods of pixel signals to the first horizontal output lines 5-1 to 5-8 are multiplexed among the groups. The multiplexing secures statically determined periods (charging periods) of the first horizontal output lines 5-1 to 5-8, allows readout to be performed into the second horizontal output line 6 at high speed, and turns on the current source 3-1 for a minimum necessary period. Accordingly, an advantageous effect of reducing the power consumption is exerted.

n pixel circuits 1 and n readout circuits 50 in the horizontal direction are configured into one group. The shift time of starting to drive the source follower circuits 2 and 3-1 in each group is set to be time for one column, thereby securing drive time for n units. This setting allows final readout time for the pixel signal on one column to be time for one column. In this embodiment, eight columns are regarded as one group. In conformity with the number of pixels in the horizontal direction and a required drive speed, one group may include any number (at least two) of pixels. The foregoing readout circuit 50 is not limited to this configuration. Alternatively, this circuit may be one of a voltage follower circuit and a differential amplifier.

Figure 3:
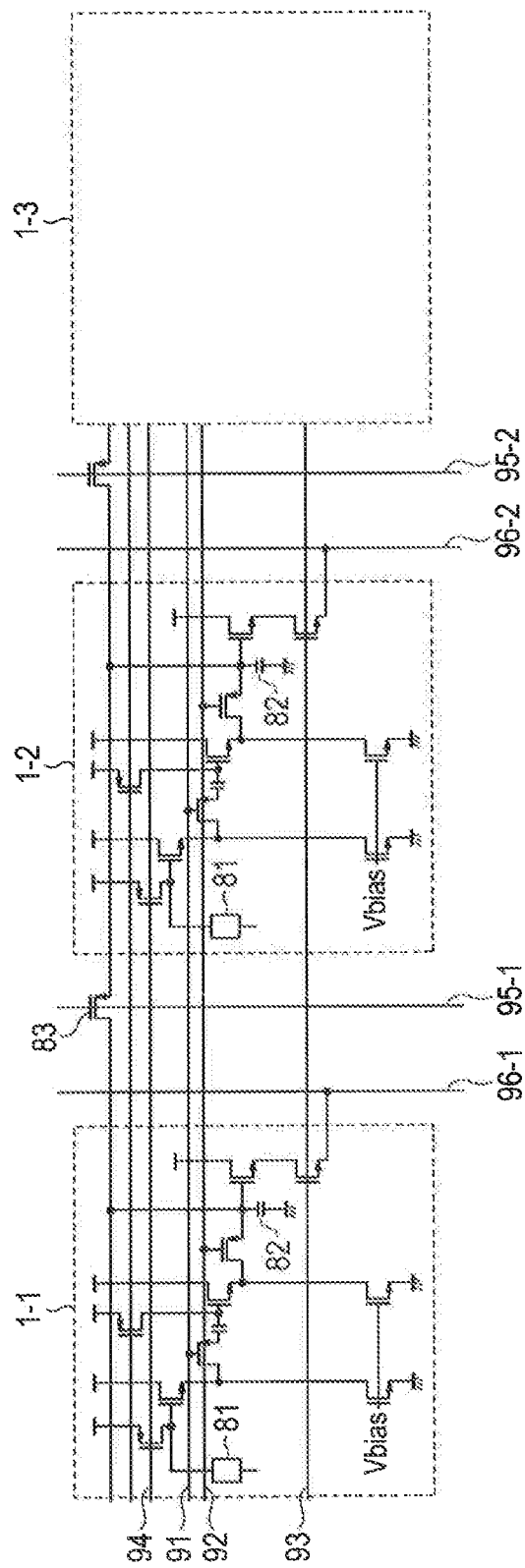
FIG. 3 is a diagram illustrating an example of configurations of pixel circuits.

Next, the pixel skipping reading mode is described. FIG. 3 is a circuit diagram illustrating an example of configurations of the pixel circuits 1-1 to 1-3. The pixel circuits 1-1 to 1-3 each correspond to the pixel circuit 1 in FIG. 1. A photoelectric conversion element 81 is, for instance, a photodiode. This element converts incident light into charges to thereby generate a pixel signal. The pixel signal of the photoelectric conversion element 81 passes through a pixel source follower and a clamp circuit, and is sampled and held in a memory 82. The adding switch (adding unit) 83 is a switch for connecting multiple pixel circuits 1-1 and 1-2. In the pixel skipping reading mode, the number of active readout circuits 50 is smaller than the number in the total pixel reading mode. Here, an example is described where pixel signals from pixels on different columns are added together in the pixel skipping reading mode. In this case, the control line 95-1 turns on the adding switch 83 and averages the signals in the memories 82 of the pixel circuits 1-1 and 1-2 adjacent to each other; the same averaged signal is held in both the memories 82 of the pixel circuits 1-1 and 1-2. The adding switch 83 adds, to each other, the pixel signals of the pixel circuits 1-1 and 1-2 on different columns. The signals held in the memories 82 are output through the source followers to vertical signal lines 96-1 and 96-2 according to a control signal in a row selecting line 93. The vertical signal lines 96-1 and 96-2 correspond to the vertical signal lines 111-1 and 112-1 in FIG. 1.

Figure 4:
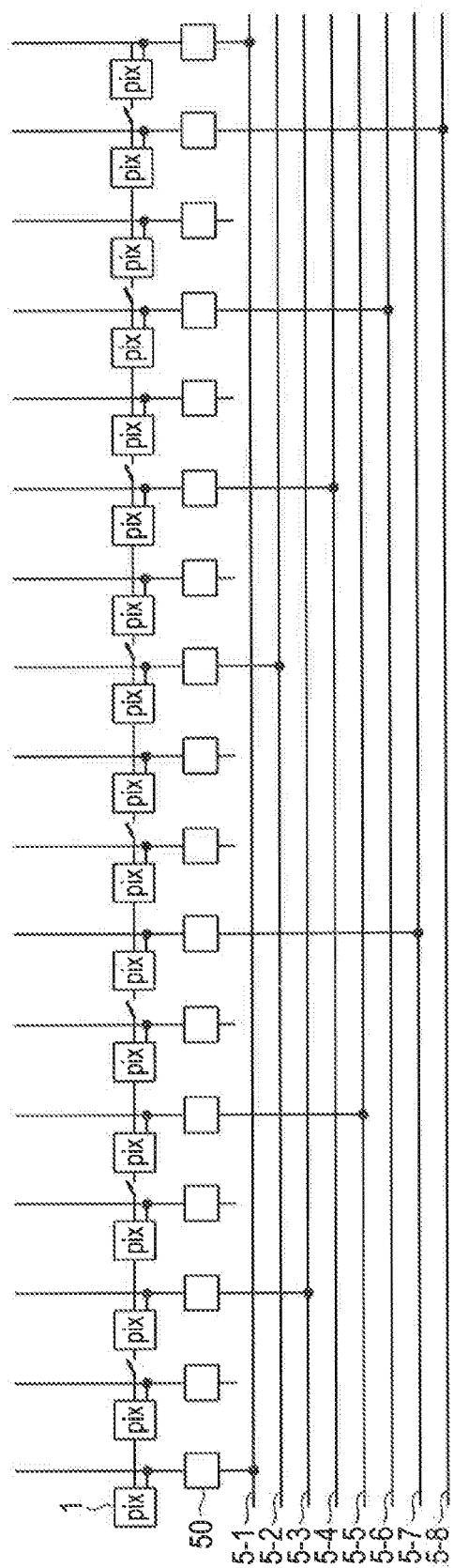
FIG. 4 is a circuit diagram of an adding pixel skipping reading mode for every two columns.

FIG. 4 illustrates a diagram of the case where one column is read between each two columns sequentially from the first column, and readout circuits 50 to be selected are connected to the respective first horizontal output lines 5-1 to 5-8. To facilitate understanding of pixel skipping, in FIG. 4, readout circuits 50 that are not subjected to pixel skipping reading are not connected to the first horizontal output lines 5-1 to 5-8. The readout circuit 50 includes the input transistor 2, the current source 3-1 and the column selecting switch 101-1 in FIG. 1. In FIG. 4, two-pixel-binning skipping readout is performed, first horizontal output lines to be selected are selected according to an order of 5-1, 5-3, 5-5 and 5-7 and then an order of 5-2, 5-4, 5-6 and 5-8. Such selection is made because, if 5-1, 5-3, 5-5 and 5-7 are repeatedly selected, the statically determined period (charging period) for a signal read into the first horizontal output line is halved. There is thus a possibility that a correct signal cannot be acquired. In contrast, in pixel skipping reading where eight pixel columns in one group are read into eight first horizontal output lines 5-1 to 5-8, signals of readout circuits 50 on odd-numbered columns in odd-numbered groups are read into odd-numbered first horizontal output lines 5-1, 5-3, 5-5 and 5-7. In even-numbered groups, signals of readout circuits 50 on even-numbered columns are read into even-numbered first horizontal output lines 5-2, 5-4, 5-6 and 5-8. That is, circuits in the first group (odd-numbered group) among the multiple readout circuits 50 output pixel signals to the output lines 5-1, 5-3, 5-5 and 5-7 in the first group among 2n first horizontal output lines 5-1 to 5-8. Readout circuits in second groups (even-numbered groups) among readout circuits 50 output pixel signals to the output lines 5-2, 5-4, 5-6 and 5-8 in the second groups among 2n first horizontal output lines 5-1 to 5-8.

Figure 5:
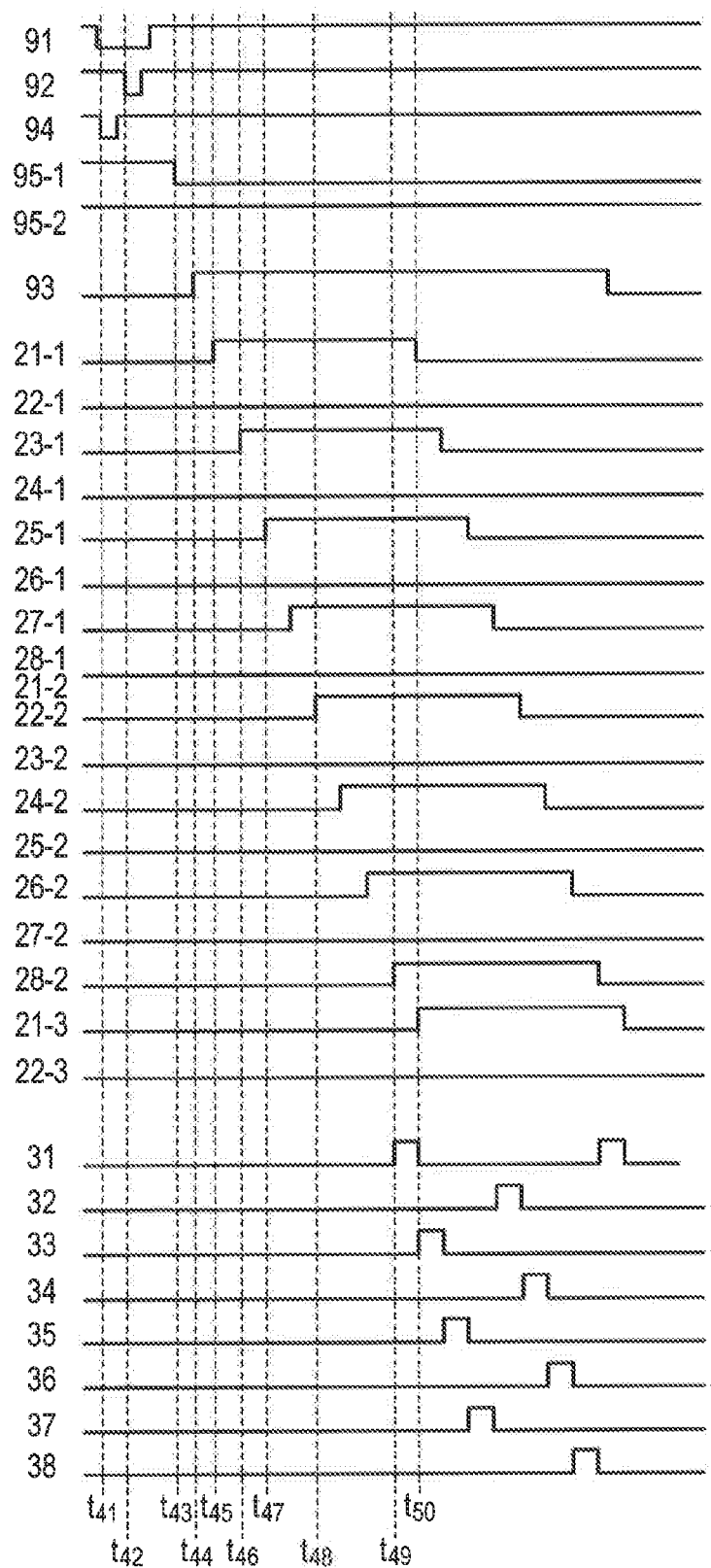
FIG. 5 is a timing chart of adding pixel skipping reading for every two columns.

FIG. 5 is a timing chart illustrating a method of driving in the two-pixel-binning skipping readout mode and including driving of the pixel circuit 1. On time t41, in a state where the low level in a pixel enabling line 91 turns on the pMOS transistor of the pixel enabling line 91, setting of a reset control line 94 to the low level turns on the pMOS transistor to turn on the reset control line 94, thereby resetting the photodiode 81. Subsequently, setting of the reset control line 94 to the high level turns off the pMOS transistor on the reset control line 94.

Next, on time t42, setting of a sample-and-hold control line 92 to the low level turns on the pMOS transistor on the sample-and-hold control line 92, thereby allowing a pixel signal of the photodiode 81 to be sampled into the memory 82. Subsequently, setting of the sample-and-hold control line 92 to the high level turns off the pMOS transistor of the sample-and-hold control line 92, allowing the signal to be held in the memory 82.

Next, on time t43, setting of the control line 95-1 to the low level turns on the pixel adding switch 83, thereby allowing pixel signals in the memories 82 in the two adjacent pixel circuits 1-1 and 1-2 to be added together. For instance, signals of the pixels 1-1 and 1-2 are added to together; signals of the pixels 1-3 and 1-4 are added together. Subsequently, two pixels are added analogously thereafter.

Next, on time t44, setting of the row selecting line 93 to the high level turns on the nMOS transistor of the row selecting line 93, and allows a signal according to the signal from the memory 82 to be output to the vertical signal line 96-1.

Next, on time t45, the control line 21-1 is set to the high level, which turns on the column selecting switch 101-1 and the current source 3-1 of the readout circuit 50 on the first column in the first group. Next, on time t46, the control line 23-1 is set to the high level, which turns on the column selecting switch 103-1 and the current source 3-3 of the readout circuit 50 on the third column. The control line 22-1 is maintained at the low level. Accordingly, the column selecting switch 102-1 and the current source 3-2 of the readout circuit 50 on the second column is left off. Next, on time t47, the control line 25-1 is set to the high level, which turns on the column selecting switch 105-1 and the current source 3-5 of the readout circuit 50 on the fifth column. The control line 24-1 is maintained at the low level. Accordingly, the column selecting switch 104-1 and the current source 3-4 of the readout circuit 50 on the fourth column is left off. Next, the control line 27-1 is set to the high level, which turns on the column selecting switch 107-1 and the current source 3-7 of the readout circuit 50 on the seventh column. The control line 26-1 is maintained at the low level. Accordingly, the column selecting switch 106-1 and the current source 3-6 of the readout circuit 50 on the sixth column is left off. In the odd-numbered groups, the odd-numbered readout circuits 50 are sequentially turned on.

Next, on time t48, the control line 22-2 is set to the high level, which turns on the column selecting switch 102-2 and the current source 3-10 of the readout circuit 50 on the second column in the second group (tenth column). Next, the control line 24-2 is set to the high level, which turns on the column selecting switch 104-2 and the current source 3-12 of the readout circuit 50 on the fourth column in the second group (twelfth column). Next, the control line 26-2 is set to the high level, which turns on the column selecting switch 106-2 and the current source 3-14 of the readout circuit 50 on the sixth column in the second group (fourteenth column). Next, on time t49, the control line 28-2 is set to the high level, which turns on the column selecting switch 108-2 and the current source 3-16 of the readout circuit 50 on the eighth column in the second group (sixteenth column). In the even-numbered groups, the even-numbered readout circuits 50 are sequentially turned on.

As described above, the multiple readout circuits 50 are read sequentially in an order of the first, third, fifth, seventh, tenth, twelfth, fourteenth and sixteenth columns.

On time t49, the group selecting switch 31 is turned on, and the signal of the vertical signal line 5-1 is read into the second vertical signal line 6 and output via the output amplifier 7. Next, on time t50, the group selecting switch 33 is turned on, and the signal of the vertical signal line 5-3 is read into the second vertical signal line 6 and output via the output amplifier 7. Next, the group selecting switch 35 is turned on, and the signal of the vertical signal line 5-5 is read into the second vertical signal line 6 and output via the output amplifier 7. Next, the group selecting switch 37 is turned on, the signal of the vertical signal line 5-7 is read into the second vertical signal line 6 and output via the output amplifier 7.

On time t50, the control line 21-3 is set to the high level, which turns on the column selecting switch 101-3 and the current source 3-17 of the readout circuit 50 on the first column in the third group. As with the first group, in the odd-numbered groups, the odd-numbered readout circuits 50 are sequentially turned on.

After the group selecting switch 37 is turned off, the group selecting switch 32 is turned on, and the signal of the vertical signal line 5-2 is read into the second vertical signal line 6 and output via the output amplifier 7. Next, the group selecting switch 34 is turned on, and the signal of the vertical signal line 5-4 is read into the second vertical signal line 6 and output via the output amplifier 7. Next, the group selecting switch 36 is turned on, and the signal of the vertical signal line 5-6 is read into the second vertical signal line 6 and output via the output amplifier 7. Next, the group selecting switch 38 is turned on, and the signal of the vertical signal line 5-8 is read into the second vertical signal line 6 and output via the output amplifier 7.

According to this embodiment, in the odd-numbered groups, the odd-numbered readout circuits 50 are sequentially turned on; in the even-numbered groups, the even-numbered readout circuits 50 are sequentially turned on. If the odd-numbered readout circuits 50 in all the groups were sequentially turned on, the statically determined period (charging period) for the signals of the first horizontal output lines 5-1 to 5-8 would be halved in the pixel skipping reading mode in comparison with the time in the total pixel reading mode, thereby reducing the signal amplitude. This embodiment can perform pixel skipping reading at high speed while securing the statically determined period (charging period) as long as the time of the total pixel reading mode even in the pixel skipping reading mode.

In this embodiment, pixel skipping reading in the first group is started from the odd-numbered columns. Alternatively, the reading may be started from the even-numbered column. In this case, in the second group, reading is started from the odd-numbered column.

Even if the case is allowed where the drive time for the column selecting switch 101-1 is halved and the signal amplitude is small, pixel skipping reading always on the odd-numbered columns or the even-numbered columns can be performed. Alternatively, drive time for eight columns may be secured. In this case, the pixel skipping reading time becomes twice as much.

According to the above description, pixel skipping reading is on one column between two columns. In the case where the number of skipped columns is one among an even number of columns, the foregoing reading method can be applied. Next, a method is described that performs driving at high speed while securing the longest statically determined period for the case of reading each pixel circuit 1 on one column among d columns (d is a positive integer). The method performs control such that until completion of driving of the columns connected to the first horizontal output lines 5-1 to 5-8, the columns connected to the same first horizontal output lines 5-1 to 5-8 are not selected. In this case, the signal reading period (e.g., t25–t24) and the shift time (e.g., t46–t45) of starting driving between readout groups are set such that {the statically determined period for the first horizontal output line (e.g., t50–t45)}/n. This setting can achieve optimal driving.

In this embodiment, among the readout circuits 50 on plural columns connected to the combination of the pixel circuits 1-1 and 1-2, which are subjected to adding by the adding switch 83, only the readout circuit 50 on one column performs the read out. All of the 2n first horizontal output lines 5-1 to 5-8 receives input of pixel signals from one of the plural readout circuits 50.

This embodiment has described the example where the pixel signals from pixels on columns adjacent to each other are added in the pixel skipping reading mode. Alternatively, the case may be allowed where pixel signals are not added and pixel signals of pixels on part of columns are not read.

Second Embodiment

Figure 6:
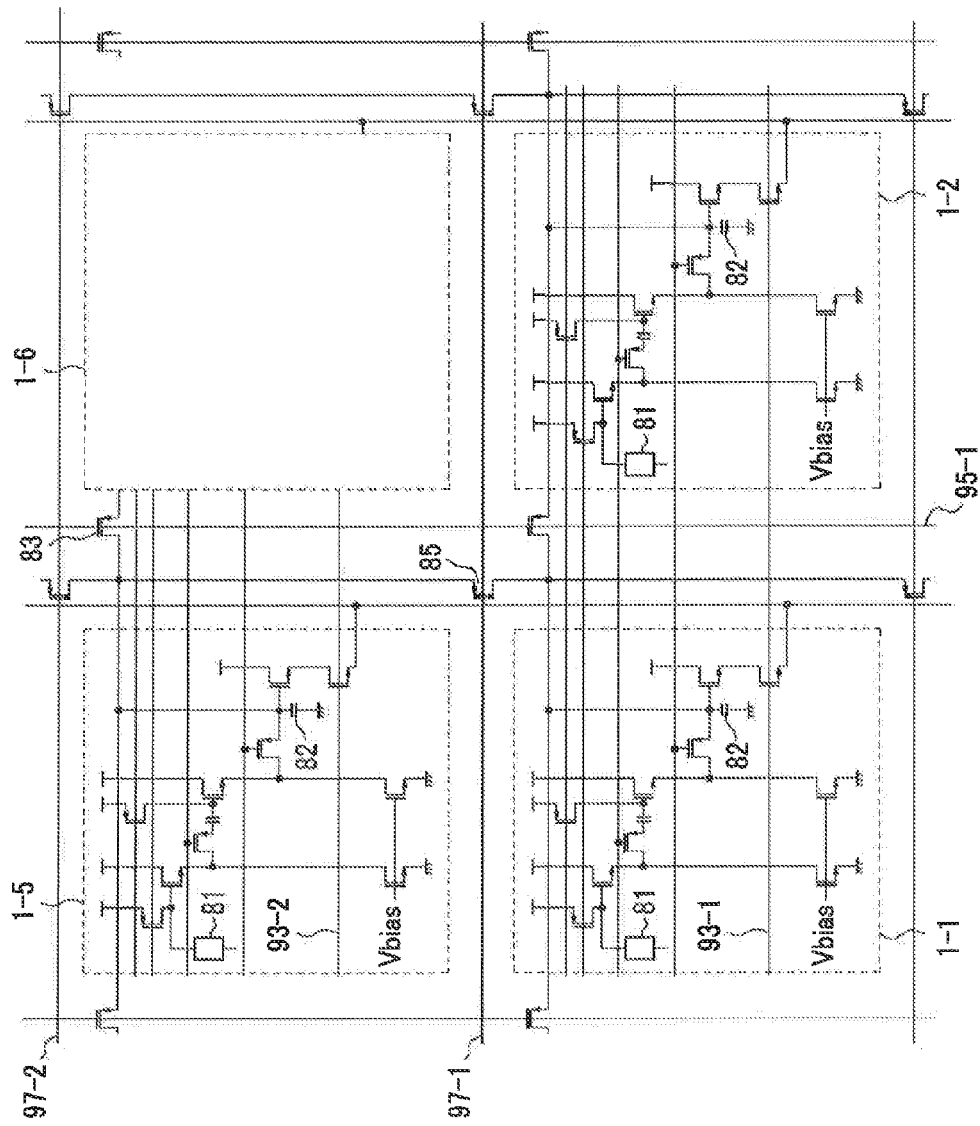
FIG. 6 is a diagram illustrating horizontal and vertical adding according to a second embodiment.

FIG. 6 is a diagram illustrating a configurational example of a pixel circuit according to a second embodiment of the present invention. This configuration allows pixel adding in the horizontal and vertical directions. FIG. 6 illustrates pixel circuits 1-1, 1-2, 1-5 and 1-6 in two rows and two columns. In actuality, the number of pixel circuits ranges from several hundred to several thousand pixels in a matrix. The pixel signals of the pixel circuits 1-1, 1-2, 1-5 and 1-6 adjacent in the horizontal and vertical directions are added in memories 82. When a control line 95-1 turns on horizontal adding switches (adding units) 83, the memories 82 of the pixel circuits 1-1 and 1-2 adjacent in the horizontal direction are connected to each other and the memories 82 of the pixel circuits 1-5 and 1-6 adjacent in the horizontal direction are connected to each other. When a control line 97-1 turns on vertical adding switches (adding units) 85, the memories 82 of the pixel circuits 1-1 and 1-2 and the memories 82 of the pixel circuits 1-5 and 1-6 are connected to each other. Thus, the memories 82 of the four pixels 1-1, 1-2, 1-5 and 1-6 are mutually connected, thereby adding the four pixel signals. The adding switches 83 and 85 add the pixel signals of the pixel circuits 1-1, 1-2, 1-5 and 1-6 on different rows and different columns. The result of adding four pixels is accumulated in the memories 82. Other points in this embodiment are analogous to those in the first embodiment.

Figure 7:
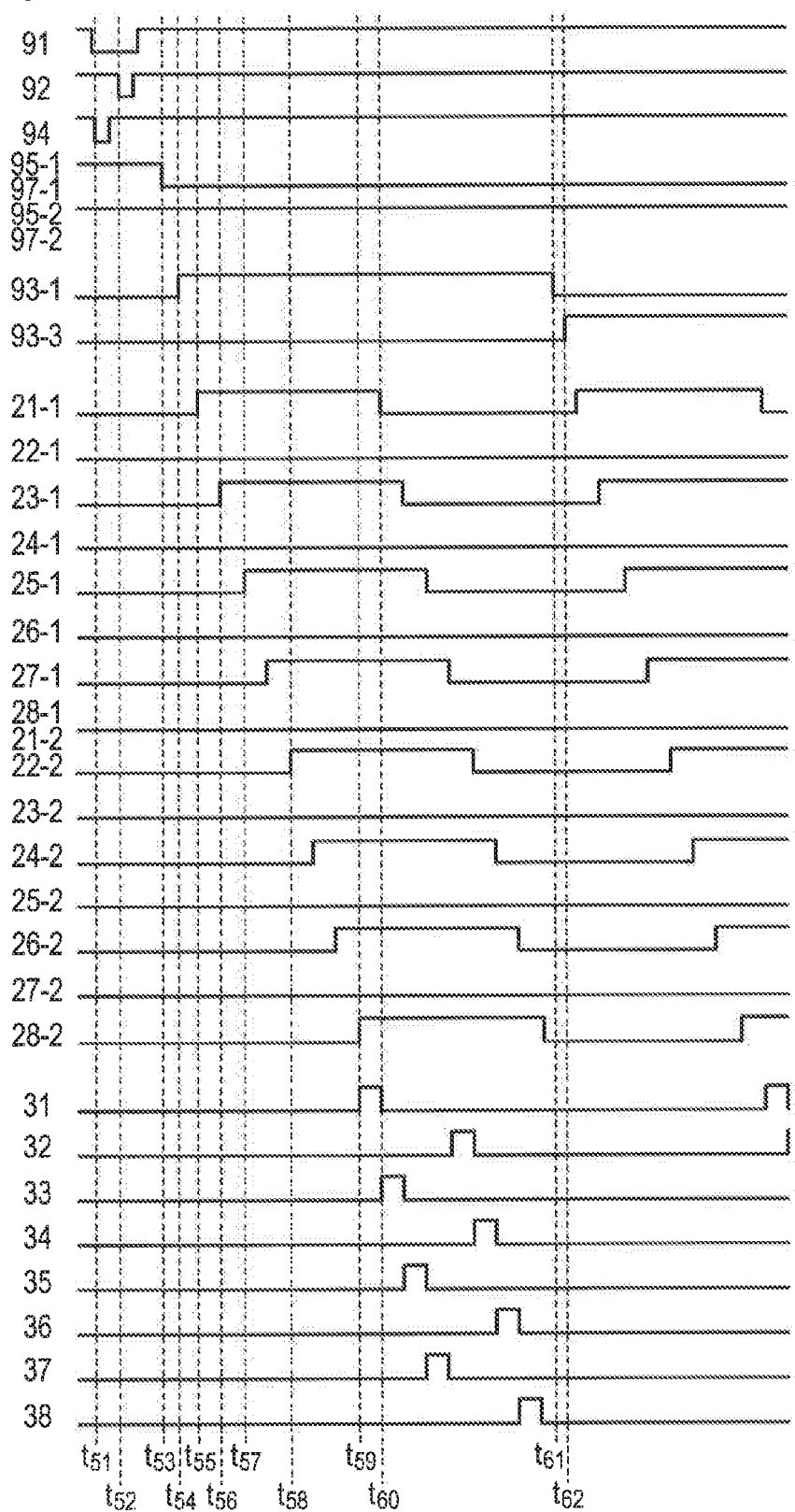
FIG. 7 is a timing chart of adding pixel skipping reading for every two columns.

FIG. 7 is a timing chart illustrating a driving method in the pixel skipping reading mode. Driving from time t51 to t53 is the same as the driving from time t41 to t43 in FIG. 5. On time t53, the control lines 95-1 and 97-1 are set to the low level, which turns on the horizontal adding switches 83 and the vertical adding switches 85, and adds the signals of the four pixel circuits 1-1, 1-2, 1-5 and 1-6. Driving from time t54 to t61 is the same as the driving on and after time t44 in FIG. 5. However, on time t54, a row selecting line 93-1 on the first row is set to the high level, which turns on an nMOS transistor on the row selecting line 93-1. After adding readout of the pixel circuits 1-1, 1-2, 1-5 and 1-6 on the first and second rows are completed, on time t61 setting of the row selecting line 93-1 on the first row to the low level turns off the nMOS transistor on the row selecting line 93-1, thereby stopping output from a pixel source follower on the first row. Next, on time t62, setting of a row selecting line 93-3 (omitted from FIG. 6) on the third row to the high level turns on an nMOS transistor on the row selecting line 93-3, thereby allowing added signals of four pixels on the third and fourth rows to be output to the vertical signal line. Driving thereafter is performed on the fifth and sixth rows in a manner analogous to the driving on the first and second rows. In this embodiment, limitation on the number of first horizontal output lines 5-1 to 5-8, the number of added pixels, and the number of pixel skipping readings is analogous to the limitation in the first embodiment. The number of pixels in the vertical direction and the number of added pixels are not limited to the above example.

In the configuration in FIG. 6, the adjacent pixel circuits 1-1, 1-2, 1-5 and 1-6 are connected to each other by the switches 83 and 85. Accordingly, for instance, in the case of adding signals of 2×2, four pixels, the signals of the four pixels can be added even with possible failure of any switch. Furthermore, the parallel switch arrangement of the switches 83 and 85 allows pixel signals to be added even with possible failure of any of the switches 83 and 85. That is, the switches 83 and 85 are connected in parallel between multiple pixel circuits. The switches arranged in parallel can be controlled by the identical control lines.

Any of the foregoing embodiments only describes a specific example for implementing the present invention. The technical scope of the present invention should not be construed in a limited manner owing to the embodiments. That is, the present invention can be implemented in various forms without departing from the technical thought or principal characteristics. According to each of the aforementioned embodiments, in the cases of pixel skipping driving and adding driving, reduction in charging period on the first output lines is prevented, which in turn can prevent reduction in signal amplitude.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-141006, filed Jul. 4, 2013, which is hereby incorporated by reference herein in its entirety.

What is claimed is:

1. An imaging apparatus comprising:
a first group comprising first pixel circuits and 2n first readout circuits, said first pixel circuits being arranged in 2n first columns, each of the first pixel circuits being configured to generate a pixel signal by photoelectric conversion, and each of said 2n first readout circuits being provided correspondingly to a different column among the 2n first columns and configured to read out a signal corresponding to the pixel signals from the first pixel circuits in a corresponding first column;
a second group arranged adjacent to the first group and comprising second pixel circuits and 2n second readout circuits, said second pixel circuits being arranged in 2n second columns, each of the second pixel circuits being configured to generate a pixel signal by photoelectric conversion, and each of said 2n second readout circuits being provided correspondingly to a different second column among the 2n second columns and configured to read out a signal corresponding to the pixel signals from the second pixel circuits in a corresponding second column;
2n first output lines wherein output terminals of the first readout circuits and the second readout circuits of every 2n columns are commonly connected to one of the 2n first output lines;
first adding units, each of the first adding units being configured to add the pixel signals from the pixel circuits arranged in different 2i first columns adjacent to each other among the 2n first columns; and
second adding units, each of said second adding units being configured to add the pixel signals from the second pixel circuits arranged in different 2j second columns adjacent to each other among the 2n second columns, wherein
n, i and j are positive integers, with i and j both being smaller than n,
each of the output terminals of the first readout circuits is connected to a different one of the 2n first output lines,
each of the output terminals of the second readout circuits is connected to a different one of the 2n first output lines,
in the 2n first readout circuits, one first readout circuit per the first readout circuits of the 2i first columns performs the read out,
in the 2n second readout circuits, one second readout circuit per the second readout circuits of the 2j second columns performs the readout,
each of odd-numbered first output lines among the 2n first output lines receives output from a different one of the first readout circuits, and
each of even-numbered first output lines among the 2n first output lines receives output from a different one of the second readout circuits.

2. The imaging apparatus according to claim 1, wherein the first adding unit further adds signals corresponding to the pixel signals from the pixel circuits in different row.

3. The imaging apparatus according to claim 1, wherein the first readout circuits which perform the reading out respectively correspond to a first column, a third column, a fifth column, a seventh column, a tenth column, a $12^{th}$ column, a $14^{th}$ column, and a $16^{th}$ column.

4. The imaging apparatus according to claim 1, wherein each of the first readout circuit comprises a source follower circuit, and a column selecting switch configured to connect the source follower circuit to one of the first output line, and
a current source of the source follower circuit and the column selecting switch are controlled, to control the read out.

5. The imaging apparatus according to claim 1, wherein each of the first adding units is a switch.

6. The imaging apparatus according to claim 1, wherein the first adding units are connected in parallel.

7. The imaging apparatus according to claim 1, wherein the 2n first output lines are connected to a second output line through a corresponding switch.

* * * * *